United States Patent
Orloff et al.

(10) Patent No.: US 8,515,694 B1
(45) Date of Patent: Aug. 20, 2013

(54) METHODS AND SYSTEMS FOR GAUGING MULTIPLE HYDROCARBON FUEL MIXTURES

(75) Inventors: Eugene F. Orloff, Long Beach, CA (US); Sridhar Rokkam, Setauket, NY (US)

(73) Assignees: The Boeing Company, Chicago, IL (US); Parker-Hannifan Corporation, Cleveland, OH (US)

( * ) Notice: Subject to any disclaimer, the term of this patent is extended or adjusted under 35 U.S.C. 154(b) by 395 days.

(21) Appl. No.: 12/421,317

(22) Filed: Apr. 9, 2009

(51) Int. Cl.
*G01F 17/00* (2006.01)

(52) U.S. Cl.
USPC ........... 702/55; 702/50; 702/100; 702/104; 702/137; 73/1.72; 73/861; 73/861.42; 73/290 R

(58) Field of Classification Search
USPC ...... 702/50, 55, 136, 137, 100, 104; 73/1.02, 73/1.73, 861, 861.42, 290 R
See application file for complete search history.

(56) References Cited

U.S. PATENT DOCUMENTS

| | | | |
|---|---|---|---|
| 4,545,020 A | 10/1985 | Brasfield | |
| 4,809,174 A | 2/1989 | Momenthy | |
| 4,815,323 A | 3/1989 | Ellinger et al. | |
| 4,918,619 A * | 4/1990 | Orloff et al. | 702/52 |
| 4,965,731 A * | 10/1990 | Weitz, Jr. | 701/123 |
| 5,271,370 A * | 12/1993 | Shimada et al. | 123/25 A |
| 6,157,894 A * | 12/2000 | Hess et al. | 702/54 |
| 6,557,530 B1 * | 5/2003 | Benson et al. | 123/480 |

OTHER PUBLICATIONS

U.S. Appl. No. 12/141,770, filed Jun. 18, 2008.

\* cited by examiner

*Primary Examiner* — Alexander H Taningco
*Assistant Examiner* — Paul D Lee
(74) *Attorney, Agent, or Firm* — Armstrong Teasdale LLP

(57) ABSTRACT

A method for operating a fuel quantity gauging system is described. The method includes utilizing redundant sensor sets at separate locations within a fuel tank to measure properties of the fuel mixture within the fuel tank, inputting the measured properties into a fuel regression equation, a separate fuel regression equation for each sensor set location, solving the multiple fuel regression equations to determine a slope and intercept and define a fuel regression curve for the fuel mixture, and utilizing the defined fuel regression curve to calculate at least a quantity of fuel in the fuel tank.

18 Claims, 5 Drawing Sheets

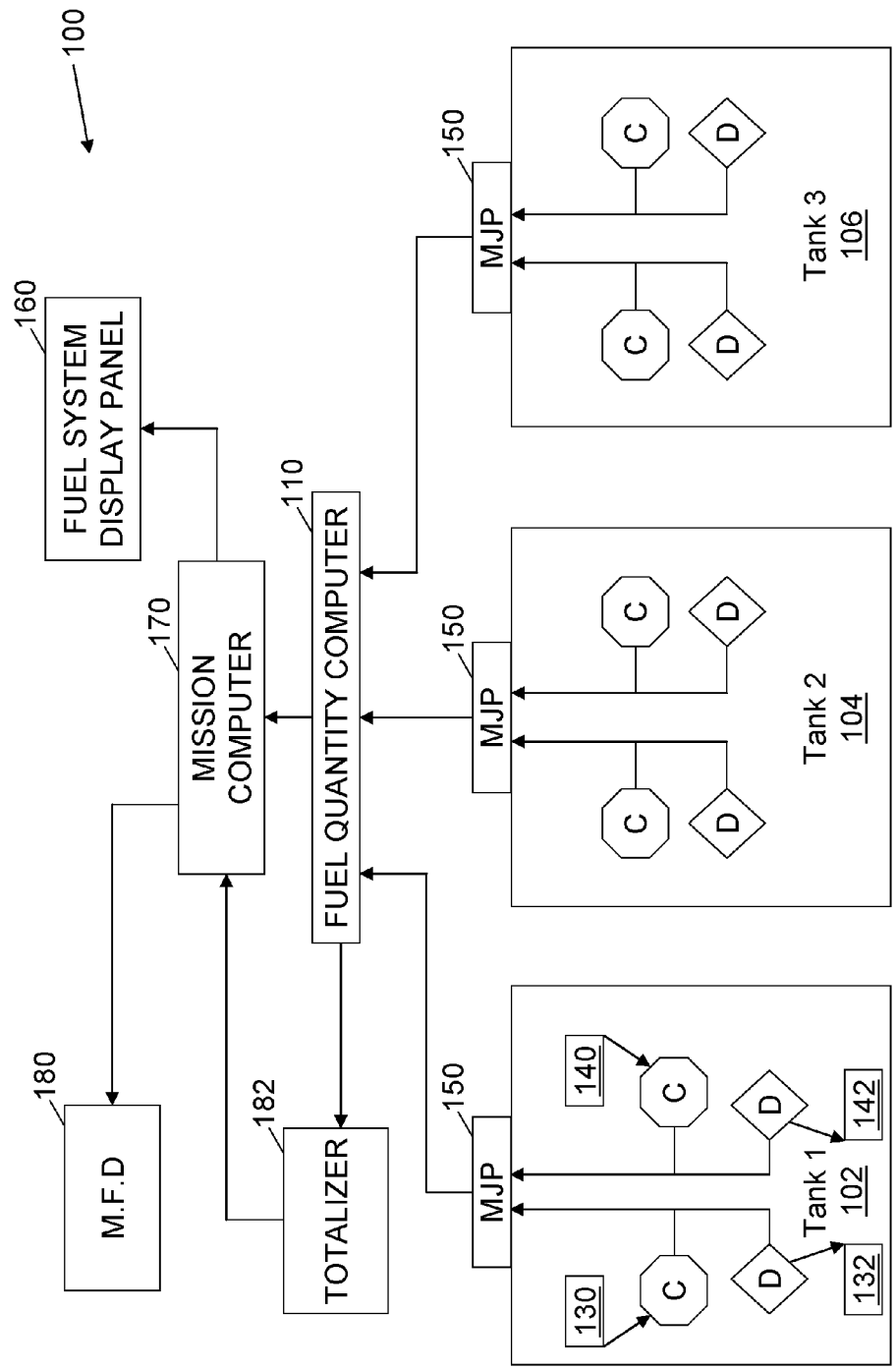

METHODS AND SYSTEMS FOR GAUGING MULTIPLE HYDROCARBON FUEL MIXTURES

FIELD OF THE DISCLOSURE

The field of the disclosure relates generally to accuracy in fuel quantity measurements and more specifically, to methods and systems for gauging multiple hydrocarbon fuel mixtures.

BACKGROUND

Fuel quantity gauging systems are generally tailored for operation with a specific fuel type. For example, one known fuel quantity gauging system was originally tailored specifically to match JP-4 fuel. Therefore, to be utilized with JP-8 fuels, the fuel quantity gauging system had to be reconfigured. Without reconfiguration, inaccuracies in the amount of fuel reported, via a display or indicator, may result. The inaccuracies are, at least in part, caused by variations in the dielectric constant (K) and the density (D) associated with each specific fuel type. More specifically, variations in the K and the D associated with various fuels affects accuracy of a fuel quantity gauging system. In one example, a fuel quantity gauging system is specified to provide an accuracy of ±1% full scale ±1% quantity of fuel indicated.

New synthetic fuels are becoming available. These synthetic fuels have different physical properties than the JP-4 and JP-8 fuels mentioned above and different physical properties than other currently utilized fuels. A portion of those different physical properties include the dielectric constant, K, and the density, D. Various fuel combinations of JP-4, JP-8, other fuels, and the synthetic fuels are viable for utilization with current jet engines. However, mixtures of such fuels result in differing K and D properties.

As explained above, current fuel quantity gauging systems may be inaccurate for certain fuel mixtures. It is desirable to eliminate such fuel gauging errors, specifically those related to fuel property variations, that are reflected in one or more of fuel tank shut off, fuel center of gravity derivation, total fuel indication, take off gross weight derivation, increase in fuel reserves, extra carried weight, and landing gross weight derivation to increase flight safety.

SUMMARY

In one embodiment, a method for operating a fuel quantity gauging system is provided. The method includes utilizing redundant sensor sets at separate locations within a fuel tank to measure properties of the fuel mixture within the fuel tank, inputting the measured properties into a fuel regression equation, a separate fuel regression equation for each sensor set location, solving the multiple fuel regression equations to determine a slope and intercept and define a fuel regression curve, and utilizing the defined fuel regression curve to calculate at least a quantity of fuel in the fuel tank.

In another embodiment, a fuel quantity gauging system is provided. The system includes a first set of sensors disposed at a first location within a fuel tank, a second set of sensors disposed at a second location within a fuel tank, and a fuel quantity computer communicatively coupled to the first set and the second set of sensors. The computer is programmed to place data associated with said first set of sensors into a first instance of a fuel regression equation, place data associated with said second set of sensors into a second instance of a fuel regression equation, solve the two fuel regression equation instances to determine a slope and intercept thereby defining a fuel regression curve, and utilize the defined fuel regression curve in the calculation of a fuel quantity for the fuel tank.

In still another embodiment, a method for deriving a fuel regression curve of a fuel is provided, where the fuel regression curve is useful in fuel quantity derivations associated with the fuel. The method includes receiving data relating to a density, a dielectric constant, and a temperature of the fuel, from a plurality of locations within a fuel tank, and solving a fuel regression equation expressed as $K-1/D=A+B(K-1)$, where K is the dielectric constant, D is the density, A is an intercept and B is the slope of a fuel regression curve, for each of the locations within the fuel tank.

The features, functions, and advantages that have been discussed can be achieved independently in various embodiments, or may be combined in yet other embodiments further details of which can be seen with reference to the following description and drawings.

BRIEF DESCRIPTION OF THE DRAWINGS

FIG. 3 is a block diagram of a fuel quantity gauging system that includes sensors within one or more fuel tanks.

DETAILED DESCRIPTION

The described embodiments are directed to systems and methods for operating a fuel quantity gauging system, and maintaining an accuracy of such a system, for multiple fuels and fuel blends. More specifically, the embodiments relate to derivation of fuel regression curves that fit a particular fuel type or blend of fuel types without degrading the system accuracy.

Figure 1:
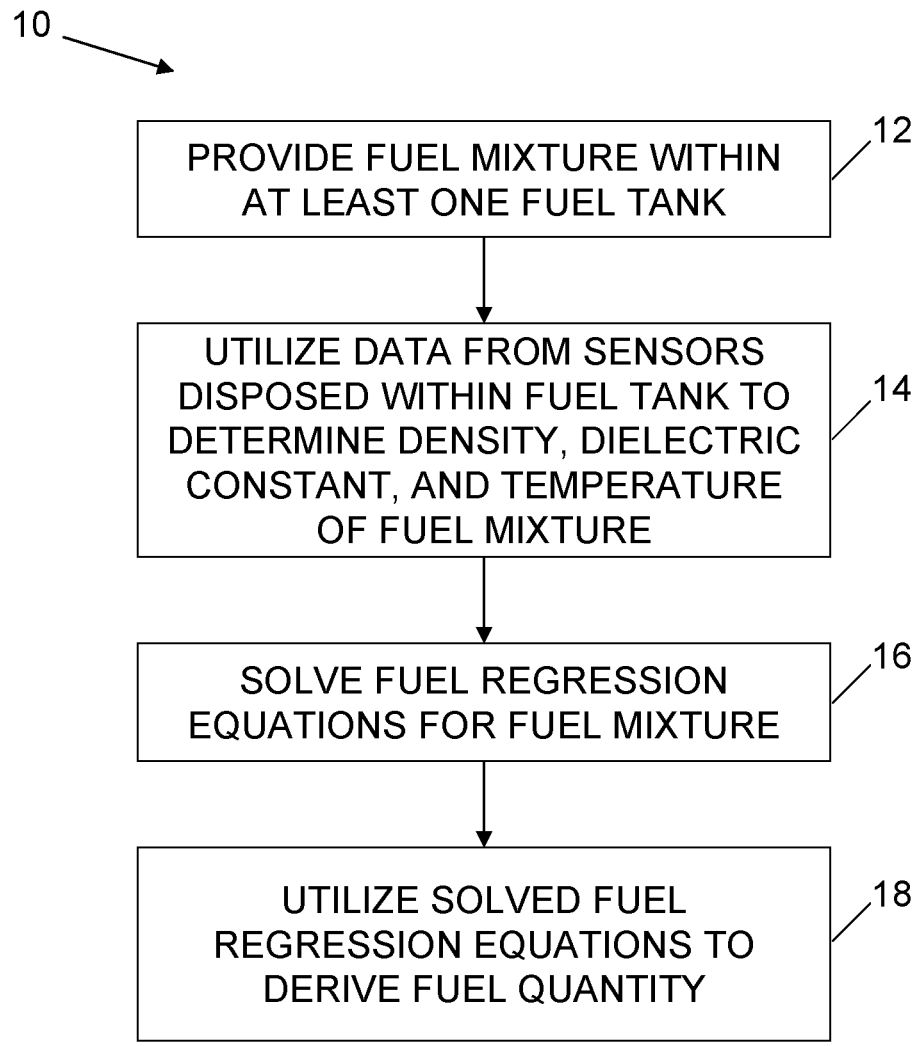
FIG. 1 is a flowchart illustrating a method for maintaining accurate operation of a fuel quantity gauging system.

FIG. 1 is a flowchart 10 illustrating operation of a fuel quantity gauging system. Specifically, a fuel mixture is provided 12 within one or more fuel tanks. Sets of sensors are utilized within the fuel tank to determine 14 density (D), dielectric constant (K), and temperature of the fuel mixture. A fuel regression equation is solved 16 for the fuel mixture, based on data received from the sensor sets, and the solved fuel regression equation is utilized 18 as a data input for fuel quantity computer calculations. In one embodiment, the fuel regression equation is expressed as:

$$K-1/D=A+B(K-1),$$

where K is the dielectric constant, D is the density, A is an intercept and B is the slope of the regression curve.

Figure 2A:
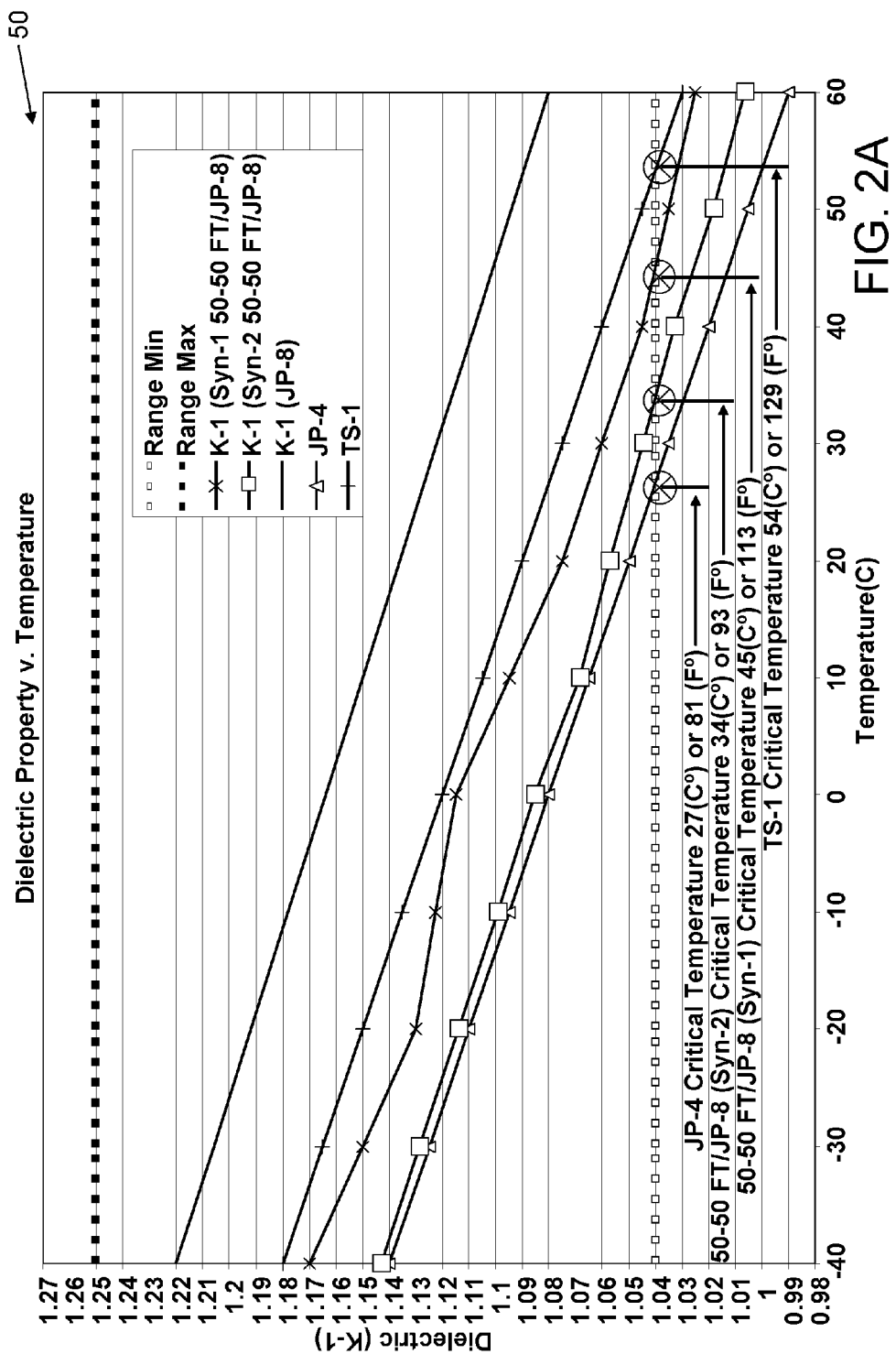
FIG. 2A is a graph that illustrates the dielectric properties of fuel mixtures as a function of temperature.
Figure 2B:
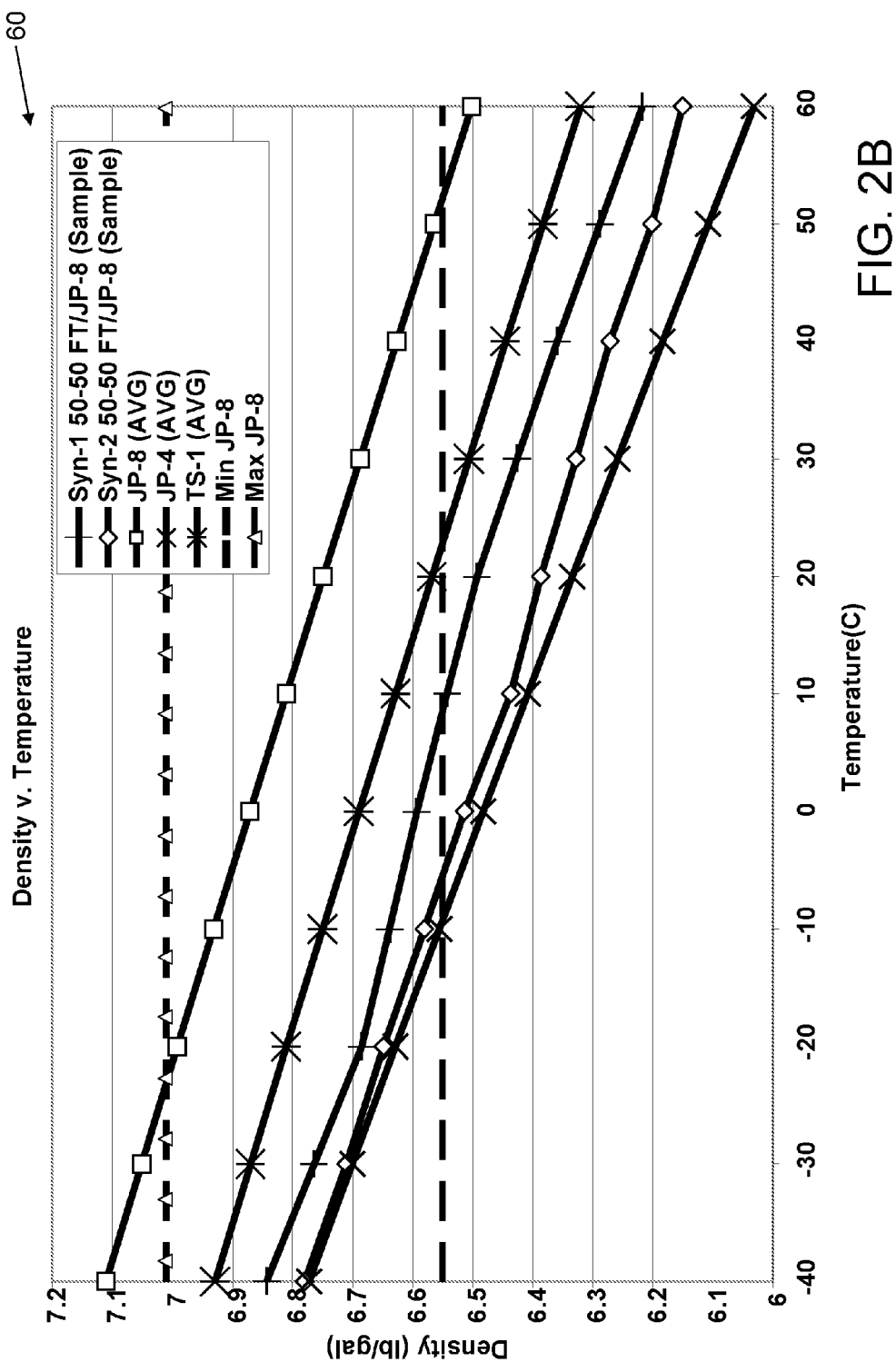
FIG. 2B is a graph that illustrates the density of fuel mixtures as a function of temperature.
Figure 2C:
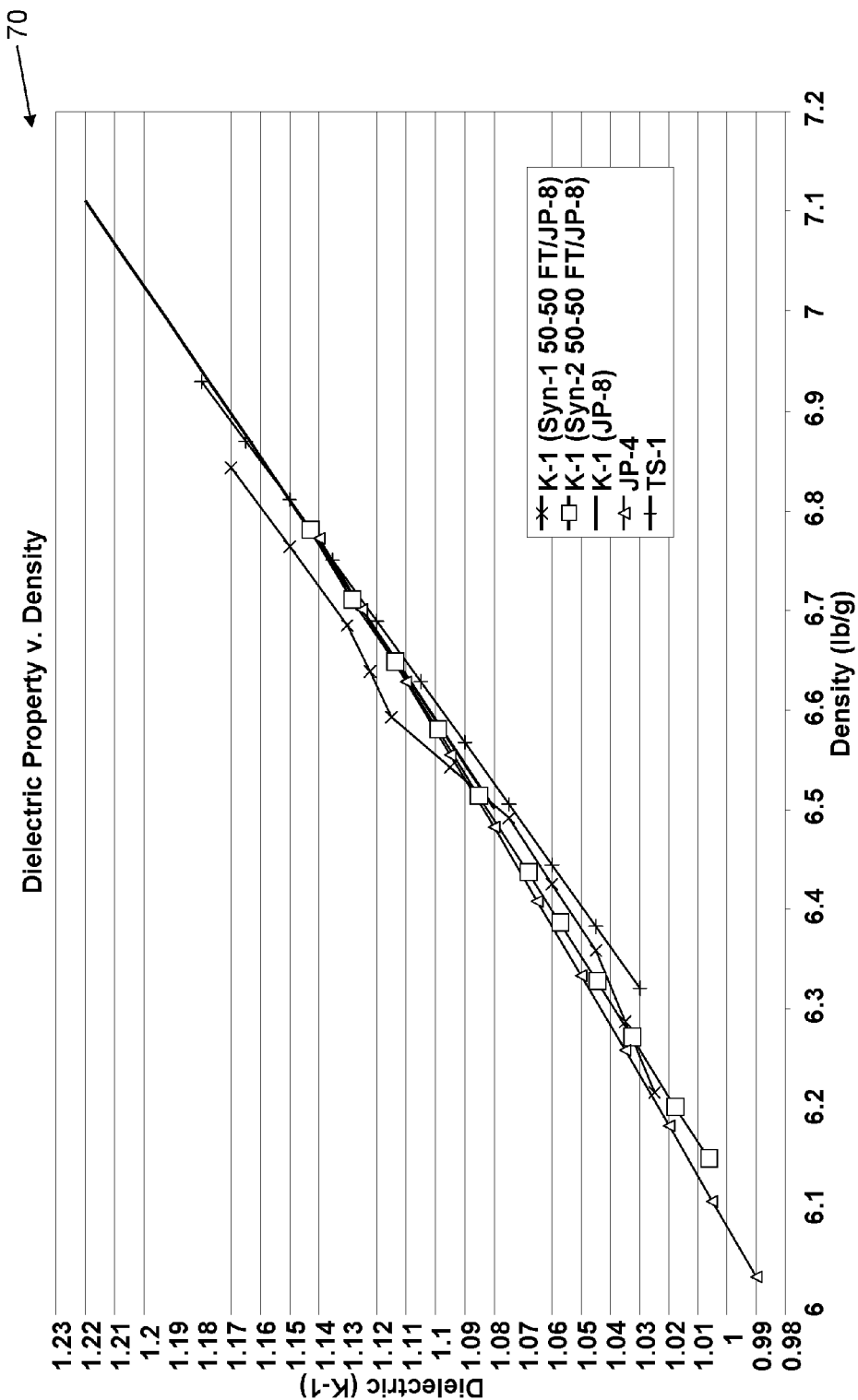
FIG. 2C is a graph of example fuel regression curves, illustrating dielectric properties as a function of density.

In one embodiment, and as further explained herein, a fuel quantity gauging system includes sensors operable to sense properties of the fuel with which they come into contact, namely dielectric constant (K), fuel density (D) and temperature (T), to derive fuel volume and fuel mass. Each fuel type, including hydrocarbon fuel types and synthetic fuel types, has a specific K and D. Therefore, fuel curves have been derived for each of these fuel types and plotted over a wide range of temperatures. FIG. 2A is a graph 50 that illustrates the dielectric properties of fuel mixtures as a function of temperature. FIG. 2B is a graph 60 that illustrates the density of fuel mixtures as a function of temperature. FIG. 2C is a graph 70 of example fuel regression curves, illustrating dielectric properties as a function of density. These curves in graph 70 are sometimes referred to as fuel regression curves, and as described above, are expressed according to the above equation, where A is the intercept and B the slope of the curve.

Currently utilized fuel gauging systems are configured to operate utilizing a specific fuel regression curve. In such systems, if one or more of the dielectric constant (K) and/or the density (D) of the fuel in the fuel tank is varied, errors may be introduced which are caused by the deviation from the system design, which is dictated by a fuel regression curve associated with a specific fuel type. Such errors may lead to inaccuracies in the derivation of fuel volume and fuel mass, which is ultimately provided to several flight related systems as data and presented to a flight crew on one or more of a dedicated display and/or indicator. Additionally, the data may be provided as one of the displays provided via a multifunction display.

FIG. 3 is a block diagram of a fuel quantity gauging system 100 that is operable with multiple fuel types and multiple mixtures of those fuel types. Fuel quantity gauging system 100 includes one or more fuel tanks 102, 104, and 106, as illustrated, and a fuel quantity computer 110.

Referring specifically to fuel tank 102, which is representative of any of the fuel tanks contemplated within this disclosure, it includes a first compensator 130 and a first densitometer 132 as well as a second compensator 140 and a second densitometer 142. In one embodiment, first compensator 130 and first densitometer 132 are located remotely from second compensator 140 and second densitometer 142. For example, first compensator 130 and first densitometer 132 may be located in a feed box area of the fuel tank 102 while second compensator 140 and second densitometer 142 may be located in an inboard tank compartment of the fuel tank 102. Fuel tanks 104 and 106 are also configured with compensators and densitometers as is described with respect to fuel tank 102.

As shown in FIG. 3, the data from first compensator 130, first densitometer 132, second compensator 140, and second densitometer 142 is provided to a multiplex junction probe 150 which is communicatively coupled to the fuel quantity computer 110. In one embodiment, fuel quantity computer 110 is configured to receive the data from the multiple components in the fuel tank 102 and solve the regression curve equation provided above. In one embodiment (not shown in FIG. 3), the fuel quantity computer 110 may be communicatively coupled to a fuel quantity totalizer indicator 182 which can be viewed by one or more members of a flight crew. In illustrated embodiment, the fuel quantity computer 110 is communicatively coupled to a mission computer 170 which in turn is communicatively coupled to a fuel system display panel 160, which can be viewed by one or more members of the flight crew. In certain embodiments, the mission computer 170 is communicatively coupled to a totalizer indicator 182 which receives data from the fuel quantity computer 110.

The mission computer 170 may also be communicatively coupled to one or more multifunction displays 180, which can be operated by various members of a flight crew to display a "fuel page". In other embodiments, each fuel tank may be communicatively coupled to its own fuel quantity indicator. Other embodiments of providing the data generated by fuel quantity computer 110 for viewing by a flight crew exist and all are operable with the fuel tank and fuel quantity computer embodiments described herein.

Through installation of a second set of compensators and densitometers in each tank, it is possible to record the fuel parameters, K, D, and T at multiple locations within a fuel tank, for example, at the feed box and inboard tank compartment, which may be at different temperatures. In at least one embodiment, temperature data is provided based on data provided by the densitometers. In certain embodiments, these densitometers are passive devices.

In operation, fuel quantity gauging system 100, first measures the fuel properties of the fuel in the fuel tanks, specifically K, D, and T of the fuel, then derives a regression curve that reflects the K and D properties for the fuel mix. The volume and the fuel mass of the fuel within the tank are then derived. Through tailoring of the fuel regression curve to the actual measured fuel properties, the gauging errors mentioned above are eliminated. The properties of each fuel, namely dielectric constant, K, and density, D vary with temperature and when plotted define a fuel curve that has a specific slope and intercept as shown in FIG. 2. It should be noted that the temperature of the fuel will vary within a fuel tank.

When two different fuels are intermixed a new fuel evolves, and this intermixed fuel has its own specific K and D. In certain applications, pumps are utilized within the fuel tank to circulate the fuel within, thereby attaining a final fuel blend for which the K and D parameters can be measured. The fuel quantity gauging system 100 derives these new parameters as well as the coefficients A and B. The slope of the regression curve for the new fuel (fuel mixture) as well as its intercept are then determined and utilized within the fuel quantity computer to preserve the specified accuracy of the fuel quantity gauging system 100.

Using the fuel regression equation, $K-1/D=A+B(K-1)$, the values of K and D from two tank locations may be inserted into separate instances of the fuel regression equation. The equations can then be solved as there are two equations with two unknowns, the unknowns being the slope and intercept A and B. Once A and B are defined, a fuel regression curve representing the particular fuel mixture is established. This new regression curve is utilized, for example, by fuel quantity computer 110, in subsequent fuel quantity gauging system calculations. As the temperature of the fuel mixture typically changes, for example, during the elevation changes and/or leveling off of a flight, the fuel regression curve may be recalculated, by again measuring the multiple Ks, Ds, and temperatures associated with the fuel tank, and then re-determining A and B to maintain the specified accuracy of the fuel quantity gauging system 100.

After in flight refueling, derivation of coefficients A and B is initiated, as it is during ground refueling, to define new fuel regression curves that closely fit the new fuel mixture. Under the above described approach, the correct values of K and D are used to derive data that is used for fuel tank quantity indication, a center of gravity for the fuel load (fuel center of gravity), and total fuel indication, all while maintaining a specified fuel quantity gauging system accuracy.

The above described embodiments provide a method of maintaining accuracy of a fuel quantity gauging system whether a tank with residual fuel is being filled or a tank is being filled with different fuel types from two fuel sources. Specifically, after refueling, boost pumps are utilized to circulate the fuel in each tank to obtain a better fuel blend. K1, D1, and T1 are recorded for all feed boxes in all fuel tanks K2, D2, and T2 are recorded for all inboard compartments in all fuel tanks. Using the data (K1, D1, T1, K2, D2, and T2) for each tank, coefficients A and B are derived for the fuel curve of each fuel tank blend to be used in initial fuel quantity gauging system calculations. When a fuel tank has fuel added to it, the derivation of A and B is repeated, at least until the final fuel blend is in each tank. The fuel regression curves that have been derived are operable for tracking changes in T changes in each feed box and therefore allows for the tracking of variations in K and D which are used in all fuel quantity gauging system calculations.

In summary, current fuel gauge systems use a predetermined fuel regression curve to calculate fuel volume and fuel mass even when the fuel properties differ from those that would be defined by properties of the fuel. This phenomenon causes gauging errors in the current fuel gauge systems. In contrast, the described embodiments, through utilization of an additional compensator and densitometer within a fuel tank, first determine properties of the fuel it has to gauge, then fuel regression curves which track those fuel properties are derived. The derived fuel curves are utilized to gauge the tank fuel. The duplication of the compensator and densitometer allow for recalculation of the fuel regression curves whenever needed, such as when additional fuel is introduced into a fuel tank. One result of such a system and method is that there are no mismatches between the fuel properties and the fuel regression curves.

The embodiments may be shown to improve efficiency since the increase in fuel gauging system accuracy may allow for a decrease in the required fuel reserves for an aircraft, thereby lightening the load the aircraft must carry over the course of a flight.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for operating a fuel quantity gauging system, said method comprising:
   using at least one pump to blend a first fuel from a first fuel source with a second fuel from a second fuel source to produce a fuel mixture within a fuel tank;
   utilizing redundant sensor sets at separate locations within the fuel tank to measure properties of the fuel mixture within the fuel tank, wherein the redundant sensor sets include a first sensor set in a feed box area in the fuel tank and a second sensor set in an inboard tank compartment in the fuel tank;
   inputting, using a fuel quantity computer coupled to the redundant sensor sets, the measured properties from the feed box area into a first instance of a fuel regression equation, wherein the first instance of the fuel regression equation includes an unknown intercept A and an unknown slope B;
   inputting, using the fuel quantity computer, the measured properties from the inboard tank compartment into a second instance of the fuel regression equation, wherein the second instance of the fuel regression equation includes the unknown intercept A and the unknown slope B;
   solving, using the fuel quantity computer, for the unknown intercept A and the unknown slope B by combining the first and second instances of the fuel regression equation, wherein the solved slope B and the solved intercept A define a fuel regression curve; and
   utilizing the defined fuel regression curve to calculate at least a quantity of fuel in the fuel tank.

2. A method according to claim 1 wherein the fuel regression equation is expressed as $K-1/D=A+B(K-1)$, where K is a dielectric constant, and D is a density.

3. A method according to claim 1 wherein utilizing redundant sensor sets at separate locations comprises utilizing each of a densitometer, to provide fuel mixture density data, D, and a compensator, to provide a dielectric constant of the fuel mixture, K, at each sensor set location.

4. A method according to claim 3 further comprising determining a temperature of the fuel mixture based on the data from the densitometer.

5. A method according to claim 1 wherein utilizing redundant sensor sets at separate locations comprises utilizing redundant sensor sets at separate locations each having a different fuel temperature.

6. A method according to claim 1 wherein utilizing the defined fuel regression curve to calculate at least a quantity of fuel in the fuel tank comprises utilizing the defined fuel regression curve to calculate at least one of a volume and a mass of the fuel in the fuel tank.

7. A method according to claim 6 further comprising configuring the fuel quantity computer to utilize the defined regression curve.

8. A method according to claim 1 further comprising:
   utilizing the defined fuel regression curves for a plurality of fuel tanks to determine a quantity of fuel in each fuel tank; and
   calculating at least one of a total fuel onboard a vehicle and a center of gravity of fuel in each of the fuel tanks.

9. A fuel quantity gauging system comprising:
   at least one pump configured to blend a first fuel from a first fuel source with a second fuel from a second fuel source to produce a fuel mixture within a fuel tank;
   a first set of sensors disposed in a feed box area in the fuel tank;
   a second set of sensors disposed in an inboard tank compartment in the fuel tank; and
   a fuel quantity computer communicatively coupled to said first set and said second set of sensors, said computer programmed to:
      place data acquired at the feed box area with said first set of sensors into a first instance of a fuel regression equation, wherein the first instance of the fuel regression equation includes an unknown intercept A and an unknown slope B;
      place data acquired at the inboard tank compartment with said second set of sensors into a second instance of the fuel regression equation, wherein the second instance of the fuel regression equation includes the unknown intercept A and the unknown slope B;
      solve for the unknown intercept A and the unknown slope B by combining the two fuel regression equation instances, wherein the solved slope B and the solved intercept A define a fuel regression curve; and
      utilize the defined fuel regression curve in the calculation of a fuel quantity for the fuel tank.

10. A fuel quantity gauging system according to claim 9 wherein said sets of sensors each comprise:
   a densitometer configured to provide data to said fuel quantity computer relating to a density, D, of the fuel within a fuel tank; and
   a compensator configured to provide data to said fuel quantity computer relating to a dielectric constant, K, of the fuel mixture within the fuel tank.

11. A fuel quantity gauging system according to claim 10 wherein the fuel regression equation is expressed as $K-1/D=A+B(K-1)$, where K is the dielectric constant, and D is the density.

12. A fuel quantity gauging system according to claim 10 wherein said densitometer is configured to provide temperature data to said fuel quantity computer.

13. A fuel quantity gauging system according to claim 9 wherein a fuel temperature at the first location is different than a fuel temperature at the second location.

14. A fuel quantity gauging system according to claim 9 further comprising a user interface, said user interface operable to initiate operation of said fuel quantity computer to calculate updated fuel regression curves, and fuel quantity, utilizing data provided by said first set of sensors and said second set of sensors.

15. A fuel quantity gauging system according to claim 9 comprising a plurality of fuel tanks, each having a said first set of sensors and a said second set of sensors disposed therein communicatively coupled to said fuel quantity computer, said fuel quantity computer is programmed to:
   define fuel regression curves for each of said fuel tanks;
   utilize the defined fuel regression curves to determine a quantity of fuel in each said fuel tank; and
   calculate at least one of a total fuel onboard a vehicle and a center of gravity of the fuel in each said fuel tank.

16. A method for deriving a fuel regression curve of a fuel mixture, the regression curve useful in fuel quantity derivations associated with the fuel mixture, said method comprising:
   using at least one pump to blend a first fuel from a first fuel source with a second fuel from a second fuel source to produce the fuel mixture within a fuel tank;
   receiving, at a fuel quantity computer, data associated with a density, a dielectric constant, and a temperature of the fuel mixture, from a plurality of locations within the fuel tank, wherein the plurality of locations include at least a feed box area in the fuel tank and an inboard tank compartment in the fuel tank;
   inputting, using the fuel quantity computer, for each of the locations within the fuel tank, the received data into a respective instance of a fuel regression equation expressed as $K-1/D=A+B(K-1)$, where K is the dielectric constant, D is the density, A is an unknown intercept and B is an unknown slope of the fuel regression curve; and
   solving, at the fuel quantity computer, for the unknown intercept A and the unknown slope B by combining the multiple instances of the fuel regression equation.

17. A method according to claim 16 wherein receiving data associated with a density, a dielectric constant, and a temperature of the fuel mixture, from a plurality of locations within the fuel tank comprises utilizing redundant sensor sets at a plurality of separate locations within the fuel tank.

18. A method according to claim 16 further comprising:
   defining the fuel regression curve for the fuel mixture from the solved intercept A and the solved slope B; and
   utilizing the defined fuel regression curve to calculate a quantity of fuel within the fuel tank.

\* \* \* \* \*